United States Patent
Theunisse et al.

(10) Patent No.: US 12,350,867 B2
(45) Date of Patent: Jul. 8, 2025

(54) METHOD FOR PRODUCING GRAMOPHONE RECORDS BY INJECTION MOULDING

(71) Applicant: Adrianus Martinus Gerardus Theunisse, Berghem (NL)

(72) Inventors: Adrianus Martinus Gerardus Theunisse, Berghem (NL); Petrus Johannes Frederik Joseph Van Hout, Helmond (NL)

( * ) Notice: Subject to any disclaimer, the term of this patent is extended or adjusted under 35 U.S.C. 154(b) by 308 days.

(21) Appl. No.: 17/757,078

(22) PCT Filed: Dec. 7, 2020

(86) PCT No.: PCT/NL2020/050762
§ 371 (c)(1),
(2) Date: Jun. 9, 2022

(87) PCT Pub. No.: WO2021/118344
PCT Pub. Date: Jun. 17, 2021

(65) Prior Publication Data
US 2023/0011470 A1    Jan. 12, 2023

(30) Foreign Application Priority Data

Dec. 9, 2019 (NL) .................................... 2024410

(51) Int. Cl.
*B29C 45/00* (2006.01)
*B29C 45/56* (2006.01)
(Continued)

(52) U.S. Cl.
CPC ...... *B29C 45/0001* (2013.01); *B29C 45/0053* (2013.01); *B29C 45/561* (2013.01); *B29C 2795/007* (2013.01); *B29K 2067/003* (2013.01); *B29K 2105/0085* (2013.01); *B29L 2017/003* (2013.01)

(58) Field of Classification Search
CPC ............ B29C 45/1704; B29C 45/0005; B29C 45/0013
See application file for complete search history.

(56) References Cited

U.S. PATENT DOCUMENTS

| 2,649,622 | A | | 8/1953 | Piccard |
| 5,470,691 | A | * | 11/1995 | Arai ....................... G11B 23/40 |
| 2012/0082811 | A1 | * | 4/2012 | Price .................. B29C 45/1704 |
| | | | | 264/537 |

FOREIGN PATENT DOCUMENTS

| DE | 1936722 A1 | 11/1970 |
| GB | 1353053 A | 5/1974 |

OTHER PUBLICATIONS

ISR; European Patent Office; NL; Feb. 26, 2021.
Isophtalic Acid; Mar. 11, 2005.

* cited by examiner

*Primary Examiner* — Thu Khanh T. Nguyen
(74) *Attorney, Agent, or Firm* — Patshegen IP; Moshe Pinchas

(57) ABSTRACT

A method for producing gramophone records by injection moulding, comprises the steps of heating polymeric material to liquefy said material, supplying liquid polymeric material under pressure from a feed zone to a space between two mould parts via a nozzle. The liquid polymeric material is passed through a single passage located in one of the mould parts and forced under pressure through the nozzle into said space. Polyethylene terephthalate isophthalic acid modified copolymer is used as said polymeric material.

7 Claims, 3 Drawing Sheets

(51) Int. Cl.
*B29K 67/00* (2006.01)
*B29K 105/00* (2006.01)
*B29L 17/00* (2006.01)

METHOD FOR PRODUCING GRAMOPHONE RECORDS BY INJECTION MOULDING

TECHNICAL FIELD OF THE INVENTION

The invention relates to a method for producing gramophone records by injection moulding, comprising heating polymeric material to liquefy said material, supplying liquid polymeric material under pressure from a feed zone to a space between two moulding mould parts via a nozzle, in which method the liquid polymeric material is passed through a single passage located in one of the mould parts and forcing the polymeric material under pressure through the nozzle into said space.

A gramophone record is a sound carrier that is played on a gramophone. It is a flat disc with a spiral groove on at least one side that runs from the edge to close to the centre and in which sound information is recorded in the form of small horizontal and/or vertical deviations from the spiral shape. These deviations are present to the left and right and to the bottom and can be scanned with a needle on the rotating disk and made audible.

Such a gramophone record is known in the embodiment of a long-playing record, which is a vinyl record made of vinyl with a diameter of 30 cm (12 inches) which is provided with a spiral groove on each side. The known gramophone record is made by pressing a roll of PVC into a disc-shaped grooved plate. PVC as a material for a long-playing record has a health risk in the event of frequent contact, in connection with the carcinogenic material PVC. Furthermore, pressing a roll of PVC into a long-playing plate requires relatively much energy and the cycle time is relatively long.

BACKGROUND OF THE INVENTION

From GB 1 353 953 A a process for the manufacture of a gramophone record is known using polyethylene terephthalate (PET) as material for injection moulding. PET is a homopolymer that can be modified by copolymerization to modify the characteristics of the material such as mechanical and dimensional stability, melting point, clearness. For example, it is well known that PET glycol-modified can be injection moulded. It appeared that gramophone records produced according to this known process had poor characteristics with respect to appearance, wear and sound quality.

SUMMARY OF THE INVENTION

An object of the invention is to provide a method for producing gramophone records with better characteristics than the gramophone records produced with the known method. To this end the method according to the present invention is characterized in that polyethylene terephthalate isophthalic acid modified copolymer (PET-IPA-modified copolymer) is used as material for injection moulding.

It is known that PET-IPA-modified copolymer in which the modifier is isophthalic acid is advantageous for certain moulding applications, such as thermoforming, which, for example, is used to make tray or blister packaging. This known copolymer is also used for the production of bottles via stretch blow moulding. In the last application only a small amount of isophthalic acid is used in the copolymer. If only small amounts of comonomers are used, crystallization is slowed but not prevented entirely.

During injection moulding, the liquid material encounters friction (shear) because it is pressed through different channels under high pressure. This makes plastics flow better (the viscosity drops). So if you e.g. injects faster, the melt flows more easily. However, PET-IPA-modified copolymer has a little "shear" dependent viscosity. PET-IPA-modified copolymer hardly has this advantage (other thermoplastics do). That is why PET-IPA-modified copolymer is difficult to process in injection moulding, especially in products with long/thin flow paths such as with an gramophone record.

Although PET-IPA-modified copolymer is not a usual material for injection moulding and is difficult to inject in long and thin flow paths, it appeared after testing more than 45 different plastic materials that it has good properties for application as a gramophone record. It has a high wear resistance, clear appearance, and good sound quality due to high mechanical and dimensional stability.

After comprehensive testing, the characteristics of PET-IPA-modified copolymer appears to be optimal for application in an injection moulding process for producing gramophone records in case the amount of the monopolymer isophthalic acid in the polyethylene terephthalate isophthalic acid modified copolymer is between 1.5 and 2.5%, preferably this amount is about 1.8%.

Further, a polyethylene terephthalate isophthalic acid modified copolymer is easy to recycle and thus the record produced with this method is more sustainable than other known records.

To optimize the injection moulding manufacturing process the material to be injected is heated to a temperature between 250 and 300° C., preferably between 270 and 290° C., before injecting the polymeric material into the space between the two mould parts.

To even more optimize the injection moulding manufacturing process the mould parts are kept at a temperature between 40 and 60° C. during injection of the material into the space between the two mould parts.

In an embodiment of the method according to the invention mould parts are kept at a distance between 1 and 5 mm from each other while injecting the polymeric material into the space between the two mould parts and immediately after injection these mould parts are moved against each other creating a mould cavity having a shape of a gramophone record (so called injection compression). This method requires significant less energy (temperature, pressure) because there is less friction during injection due to the larger dimension of the flow space between the mould parts. In case the mould parts are in contact with each other during injection of the material in the closed cavity between these two mould parts, as is the case in the method according to GB 1 353 953. A, the grooves in the mould parts are more difficult to fill so that the material should be more liquid (lower viscosity) which requires higher temperatures and thus more energy, or which requires another composition of the material that results in less sound quality of the gramophone record.

In contradistinction to the learning of the state of the art document GB 1 353 953. A to inject the polyethylene terephthalate material with a nozzle having a passage of which at least a part is directed circumferentially, in the method according to the present invention the polymeric material is injected into the space between the two mould parts via one single nozzle provided with a straight pouring channel. It appeared that by injecting in this way visible and during use audible transitions between parts of the record are avoided.

Further, in contradistinction to the learning of the state of the art document GB 1 353 953. A in which the polyethylene terephthalate material injected into the cavity has a velocity component causing rotational movement of the material, in the method according to the present invention the polymeric material is injected into the space between the two mould parts in a direction perpendicular or almost perpendicular to the moulding surfaces of the mould parts. This also contributes to avoid visible and during use audible transitions between parts of the record.

A further embodiment of the method according to the invention is characterized in that in the middle part of the gramophone record a label is printed directly on the polyethylene terephthalate isophthalic acid modified copolymer material by means of a UV-printer. So, there is no separate label pressed on the record, as a result of which the record according to the invention can be recycled completely and the labelled part does not have to be cut out and handled separately as is the case with recycling known records. The gramophone record manufactured by the method according to the invention is thus easier to recycle and thus more sustainable.

The invention also relates to a gramophone record produced with the method according to the invention. Regarding the gramophone record the invention is characterized in that it consists or consists essentially of a polyethylene terephthalate isophthalic acid modified copolymer.

Preferably, the amount of the monopolymer isophthalic acid in the polyethylene terephthalate isophthalic acid modified copolymer is between 1.5 and 2.5%.

BRIEF DESCRIPTION OF THE DRAWINGS

The invention will be further elucidated below on the basis of drawings. These drawings show an embodiment of an injection moulding device for injection moulding a gramophone record according to the invention. In the drawings.

DETAILED DESCRIPTION OF THE DRAWINGS

Figure 1:
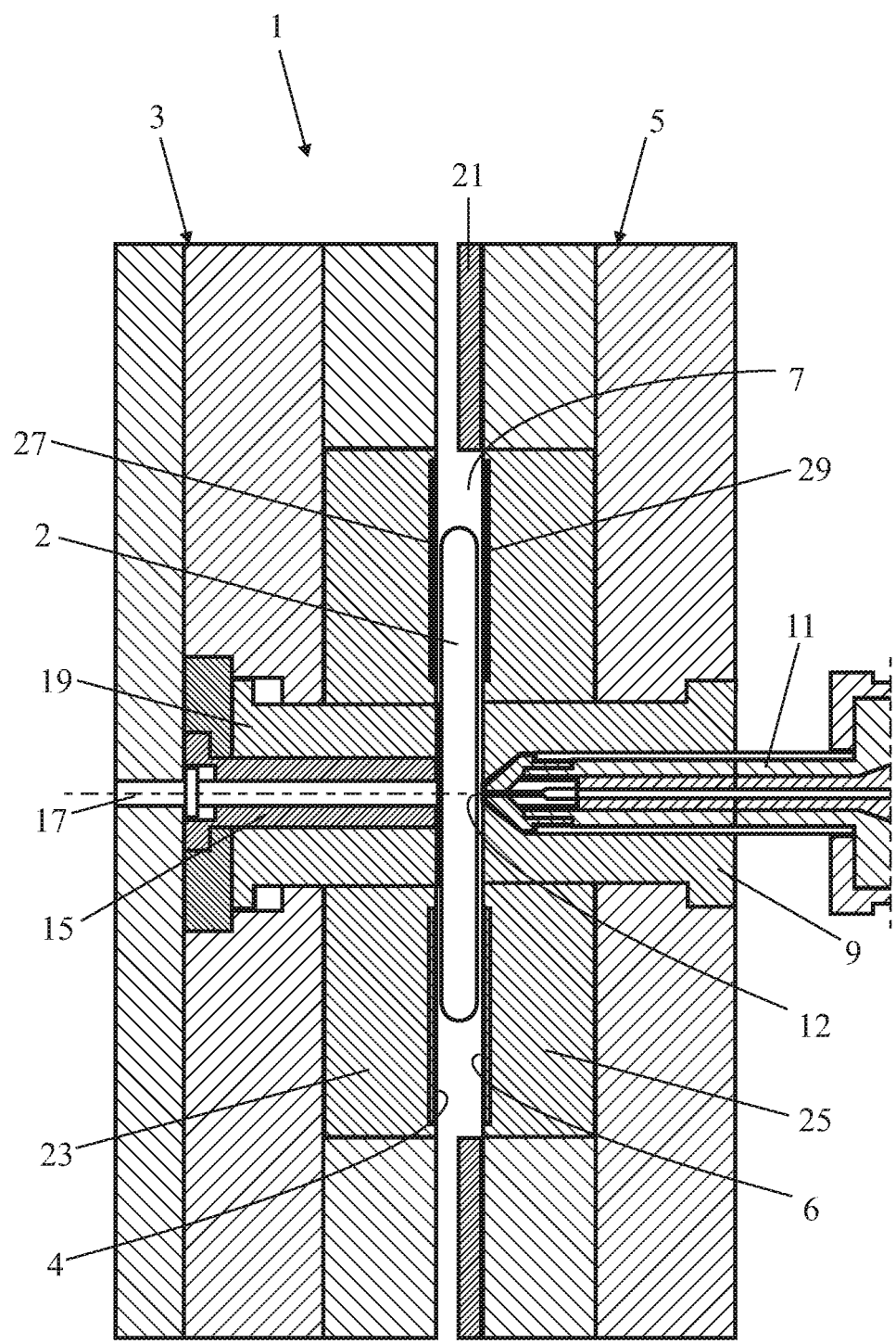
FIG. 1 is a diagrammatically representation of a mould of an injection moulding device for manufacturing a gramophone record according to the invention with closed injection channel.
Figure 2:
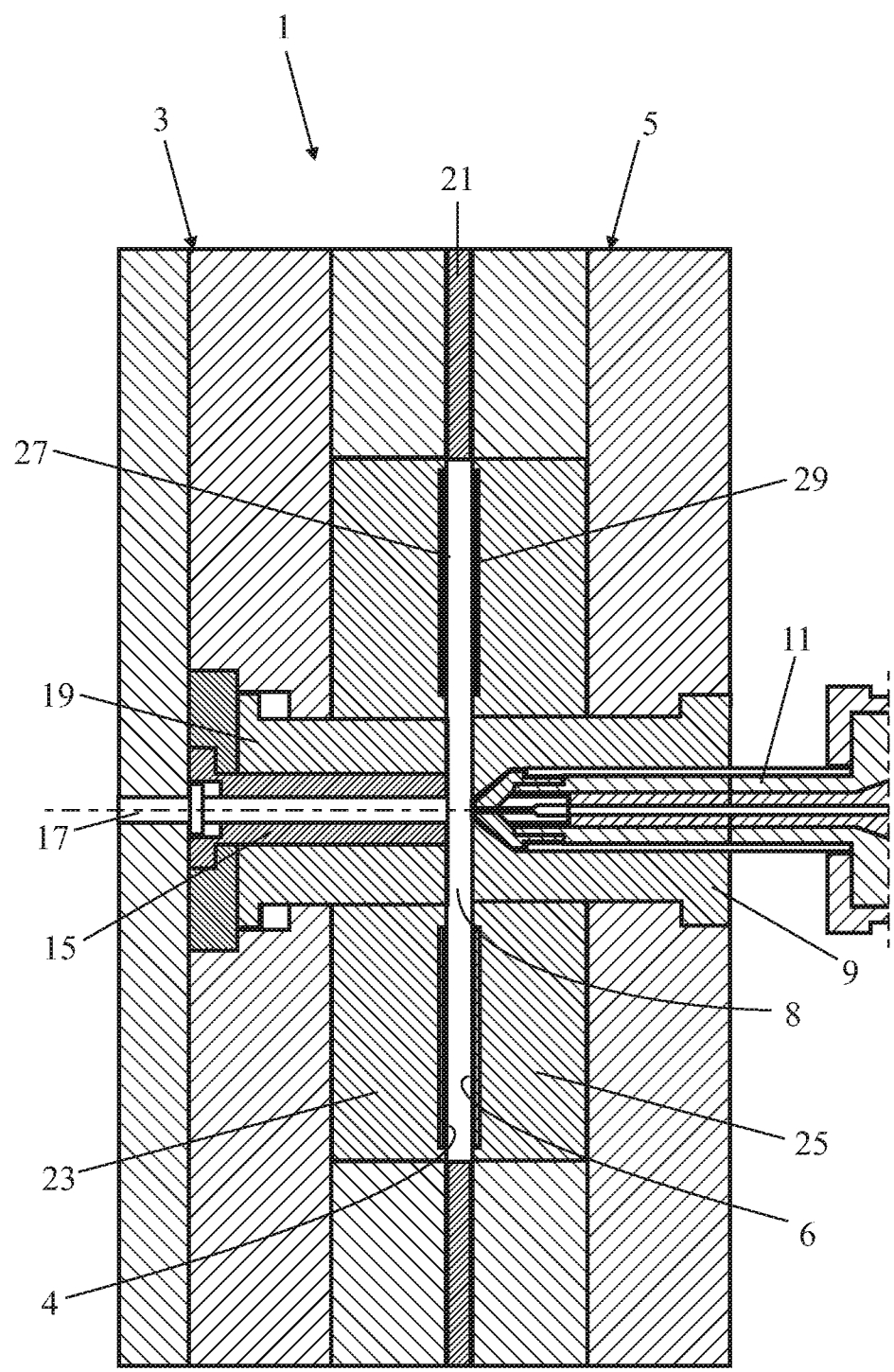
FIG. 2 is the injection moulding device with open injection channel.

An injection moulding device for injection moulding a gramophone record has a mould 1. In FIG. 1 this mould is schematically shown. The mould 1 is composed of two mould parts 3 and 5 with a space 7 in between. When the mould parts are in contact with each other the space 7 defines a mould cavity 8 (see FIG. 2) with the shape of a gramophone record. In the mould part 5 is an inset piece 9 for receiving an injection nozzle 11. Only the front part of the injection nozzle is shown. In the mould part 3 there is a central bush 15 in which an ejector 17 is displaceable for ejecting a remaining central injection piece which is not part of the gramophone record. A further ejector 19 is slidable over the bush for ejecting the gramophone record. Between the mould parts 3 and 5 there is a venting ring 21. The mould cavity 8 is bounded by two mirror parts 23 and 25 which are each provided with a pusher 27 and 29.

Figure 3:
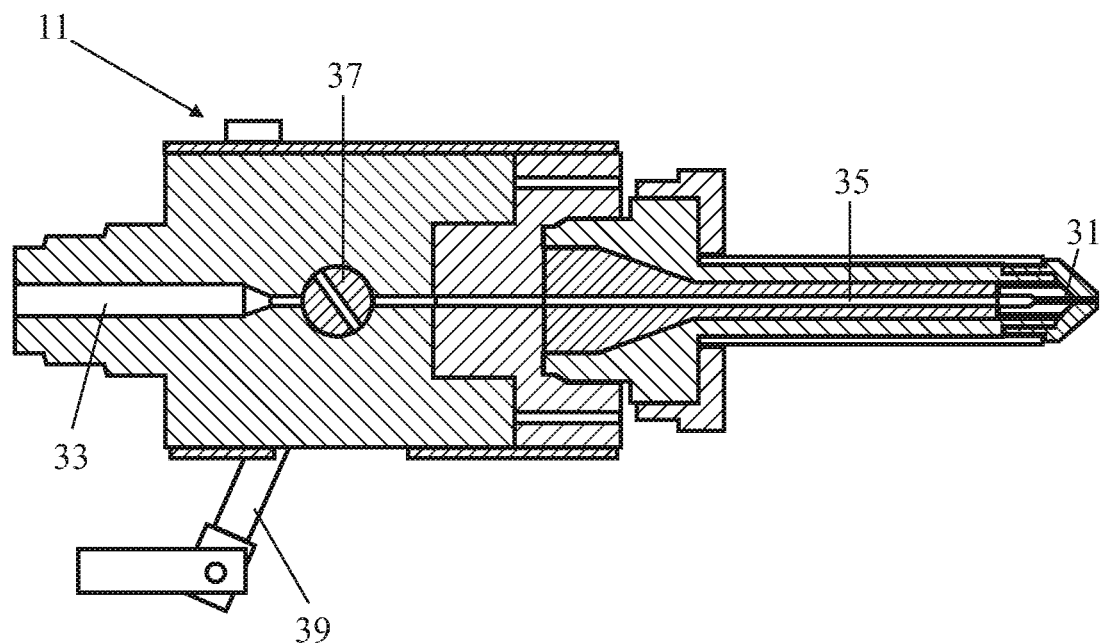
FIG. 3 is the injection nozzle of the injection moulding device with closed injection canal.
Figure 4:
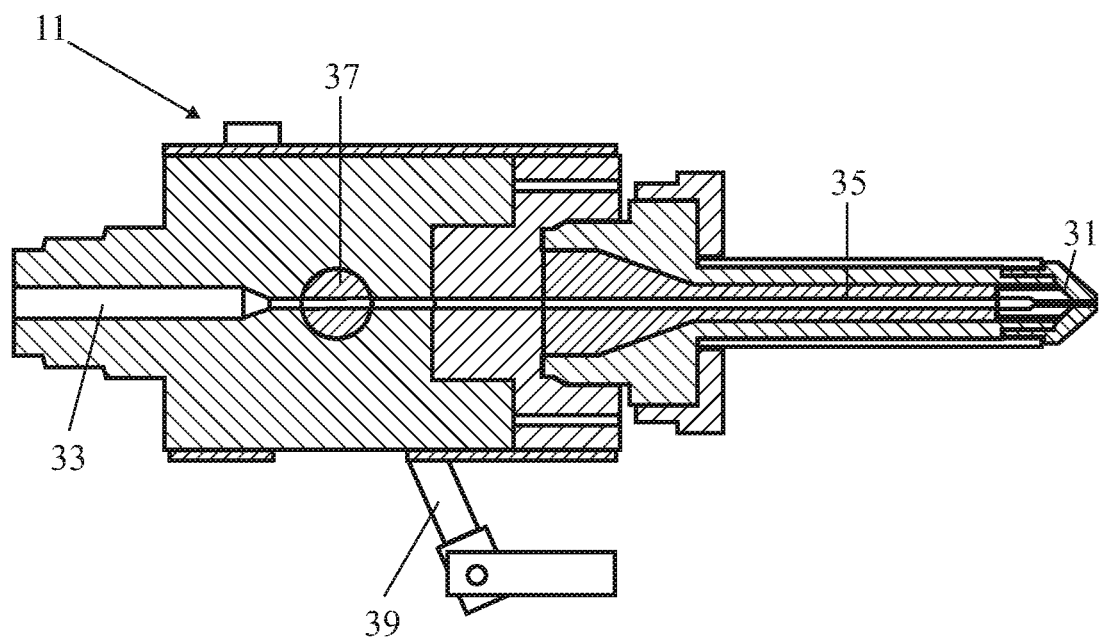
FIG. 4 is the injection nozzle of the injection moulding device with open injection canal.

The injection nozzle 11 is shown in detail in FIG. 3. The injection nozzle is provided with a nozzle piece 31 and an inlet opening 33 being part of a feed zone. A pouring channel 35 is present in the injection nozzle 11 between the inlet opening and the nozzle piece. The pouring channel 35 is completely straight and is closed by a rotatable valve 37. This valve can be adjusted by an arm 39. In FIG. 4 the injection nozzle 11 is shown with the valve 37 in the open position.

When spraying a gramophone record, moulding material (usually in the form of a granulate) of PET, with some additives to give the moulding material the optimum properties, is heated to a liquid state. The liquid material is injected under pressure into the space 7 between the mould parts 3 and 5 via a single passage 12, the material stream of the moulding material from the place where the moulding material melts into this space does not split into sub-streams which later come together again. The liquid material flows in one flow through the injection nozzle 11 into the space 7. While injecting the polymeric material into the space 7 between the two mould parts 3 and 5, the mould parts are at a distance of about 3 mm from each other, see FIG. 1. Immediately after injection these mould parts 3 and 5 are moved against each other creating a mould cavity 8 having a shape of a gramophone record, see FIG. 2.

The polymeric material 2 used for injection moulding is a polyethylene terephthalate isophthalic acid modified copolymer. Conventional additives for improvement can be added to this base polymeric material.

Although the present invention is elucidated above on the basis of the given drawings, it should be noted that this invention is not limited whatsoever to the embodiments shown in the drawings. The invention also extends to all embodiments deviating from the embodiments shown in the drawings within the scope of the invention defined by the appended claims.

The invention claimed is:

1. Method for producing gramophone records by injection moulding, comprising:

heating polymeric material to liquefy said material, said polymeric material is polyethylene terephthalate isophthalic acid modified copolymer;

supplying liquid polymeric material (2) under pressure by one single injection nozzle (11), into a space (7) between two moulding mould parts (3, 5) through a single passage (12) located in one of the mould parts (5) wherein said two moulding mould parts (3, 5) are disposed at a distance between 1 and 5 mm from each other;

immediately after injection of the liquid polymeric material the mould parts are moved against each other creating a mould cavity having a shape of a gramophone record;

wherein said injection nozzle (11) is provided with a nozzle piece (31) and an inlet opening (33) and a pouring channel (35) extending between said inlet opening (33) and said nozzle piece (31) such that the liquid polymeric material is provided with a single stream from the inlet opening (33) into the space (7) and does not split into sub-streams, and wherein said liquid polymeric material is supplied in a direction perpendicular to the moulding surfaces of the mould parts.

2. Method for producing gramophone records according to claim 1, characterized in that the amount of the monopolymer isophthalic acid in the polyethylene terephthalate isophthalic acid modified copolymer is between 1.5 and 2.5%.

3. Method for producing gramophone records according to claim 1 characterized in that before injection the polymeric material (2) into the space between the two mould parts (3, 5) the polymeric material (2) is heated to a temperature between 25° and 300° C.

4. Method for producing gramophone records according to claim 1, characterized in that during injection the mould parts (3, 5) are kept at a temperature between 4° and 60° C.

5. Method for producing gramophone records according to claim 1, characterized in that in the middle part of the gramophone record a label is printed directly on the polyethylene terephthalate isophthalic acid modified copolymer material by means of a UV-printer.

6. Method for producing gramophone records according to claim 1, wherein from the inlet opening of the injection nozzle to the nozzle piece of the injection nozzle the liquid polymeric material is supplied through a completely straight pouring channel.

7. Method for producing gramophone records according to claim 6, wherein the completely straight pouring channel can be closed by a rotatable valve.

* * * * *